July 26, 1949.  J. SANDLER  2,477,269
APPARATUS FOR THE MANUFACTURE
OF PLASTIC MOLDING POWDERS
Filed Jan. 19, 1946
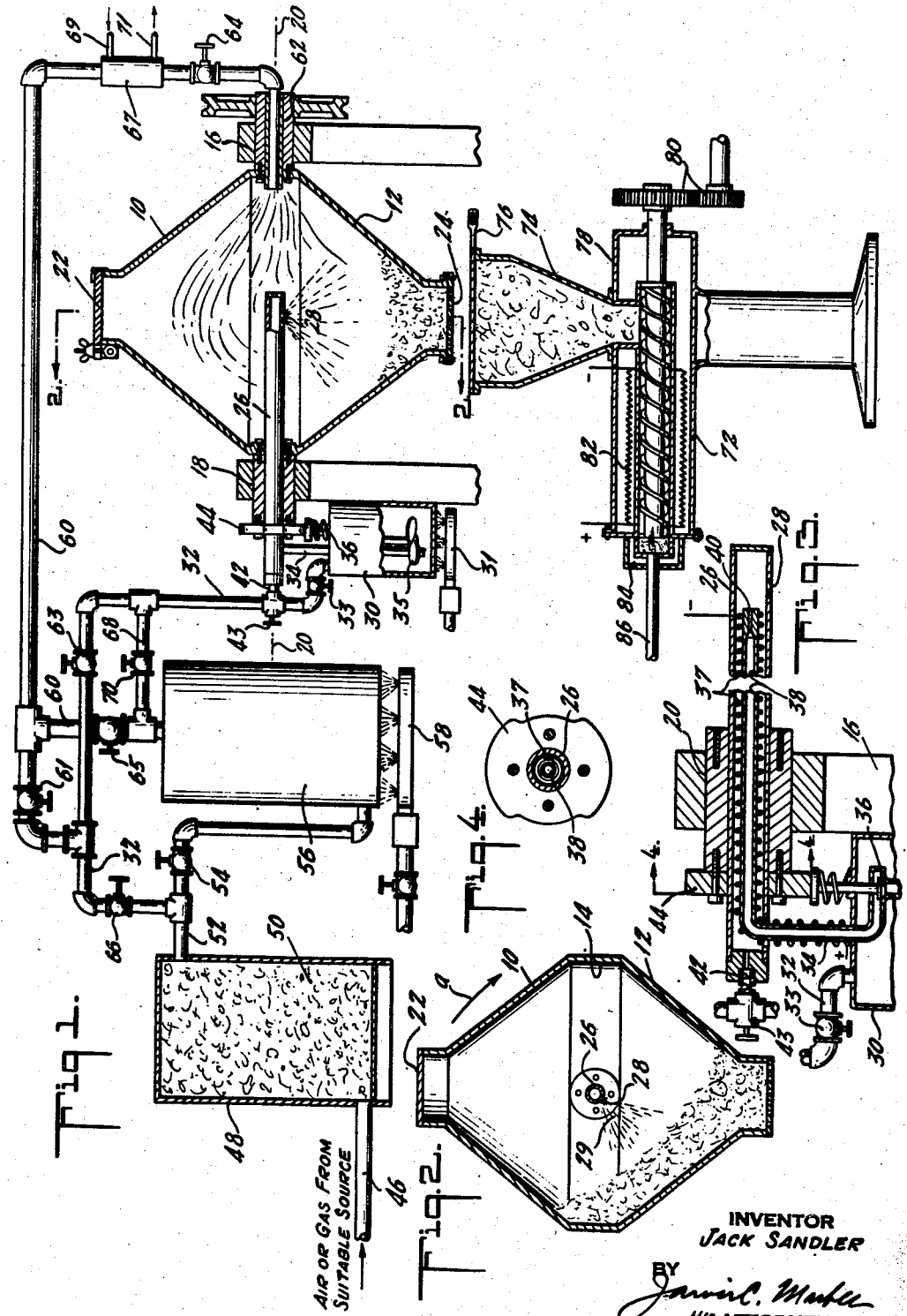
INVENTOR
JACK SANDLER
BY
*[signature]*
HIS ATTORNEY Patented July 26, 1949

2,477,269

UNITED STATES PATENT OFFICE 2,477,269

APPARATUS FOR THE MANUFACTURE OF PLASTIC MOLDING POWDERS

Jack Sandler, South Orange, N. J., assignor to Hungerford Plastic Corporation, New Providence, N. J., a corporation of New Jersey Application January 19, 1946, Serial No. 642,383

11 Claims. (Cl. 259—3)

1

This application is a continuation in part of my copending abandoned application Serial No. 578,112, filed February 15, 1945.

The present invention relates to the conditioning of solid materials in particle form and has particular reference to the conditioning of organic materials in such form which require treatment involving the addition of other material in fluid form in order to be converted into a molding material in particle form capable of being transformed by the application of heat and pressure into a cohesive solid product. Still more particularly, the invention relates to the conditioning of materials such as cellulose derivatives, vinyl polymers and other resins, and other plasticizable material requiring the addition of plasticizer and/or other organic material and in some instances the removal of volatiles in order to produce a material in particle form capable of formation into plastic bodies by heat and pressure. For convenience, the material produced by the present invention will herein be referred to generically as molding material, this term being intended to include materials suitable for subsequent application of heat and pressure by extrusion, injection, calendering, casting and like operations, which will be referred to generally as molding.

The material from which desired molding materials are made and which may for example but without limitation be a cellulose derivative, a resin or other suitable plasticizable material, is ordinarily supplied by the manufacture in powder or flake form, the particle size of which may vary widely from relatively coarse sand-like granular or even fibrous condition to relatively very fine dust-like powder. For the purpose of this specification, such material will be referred to generally as material in particle form.

Such material, depending upon its nature and the nature of the use to which the end product is to be put, may require one of a number of different treatments to condition it for molding. One of the commonest of the treatments required is the addition of a plasticizer which in most instances is a liquid and which must be uniformly distributed so that each particle of the material is plasticized if a high quality molded product free from flaws is to be obtained. In addition, it is in many instances desirable to add a colorant which may be in either powder or liquid form, inert solid filler which ordinarily is in particle form, so-called stabilizers, inhibitors, lubricants and other extraneous materials, and it is further necessary in certain instances to re-

2 move from the particle material volatiles such as residual solvents employed in producing it and moisture which the material may have absorbed from the atmosphere. Certain of the conditioning materials which it may be desired to add to the particle material before molding may be adsorbed or absorbed, while others may desirably be only for the purpose of providing a uniformly distributed coating on the particles of the mass of material.

The general object of the present invention is the provision of new and improved apparatus for processing material of the character under consideration, particularly so as to condition it to produce the desired kind of solid article by subsequent molding operations. Other and more detailed objects of the invention together with the advantages to be derived from its use will appear as this specification proceeds.

In accordance with methods heretofore employed for conditioning material to produce a suitable molding powder, the material in particle form is in most instances dissolved in a suitable solvent to form a colloidal gel-like mass to which a desired added material such for example as plasticizer is added in particle and/or liquid form. This mass of material is then mechanically mixed or kneaded to effect the desired preliminary blending or colloiding and is then worked on heated converting rolls which operate further to blend the materials and which also may drive off a part of the solvent used to produce the mass. After this operation, the resultant strips or slabs of material are then mechanically disintegrated to again form solid material in particle form which after moisture and all remaining solvent is removed is suitable for subsequent molding operations.

The above generally outlined method is relatively slow and expensive and requires the use of machinery which is heavy and expensive in relation to its capacity to produce finished material. Also, in some instances the quality of the product is impaired because of degradation resulting from relatively high temperatures to which the material must be subjected during the processing.

Recognizing the deficiencies of the general procedure above discussed, it has heretofore been proposed to effect the desired conditioning of such material without reducing it to a dough-like mass during the process, such methods involving the use of additional fluids later removed from the end product, so that the processes can be classified generally as wet processes. These latter processes have, however, not proved to be commercially practical and the processing still generally employed is that which involves reducing the material to a dough-like mass, treating it in such form, and then mechanically disintegrating the mass after it has been solidified.

The present invention, on the other hand, contemplates the provision of apparatus for conditioning the material to be treated while maintaining the material in an essentially dry state even though the desired process requires the addition of fluid conditioning material, the required uniformity of distribution of the fluid throughout the mass of particle material being accomplished as hereinafter explained.

For the purpose of this specification and the appended claims, the terms "essentially dry" or "substantially dry" as applied to the process and/or the material are to be understood as meaning that degree of dryness which results in the mass of material being treated remaining in substantially free-flowing condition in its particle form, in contrast with an agglomerated mass.

To this end, the invention contemplates agitating the mass of particle material in substantially dry state and while maintaining it in that state adding and/or removing from the particle material the other materials required in order to condition the material to produce the desired end product, such additions and/or removals being carried out under conditions of temperature and pressure and at controlled rates such as to avoid agglomeration of the mass and further so as to insure uniformity of conditioning.

The preferred manner in which the invention is carried out is by tumbling the mass to be treated in a closed rotary tumbling vessel and introducing the material which is required to be added in fluid form, by injection at a rate and so controlled in relation to the rotation of the blending vessel that the particles of the mass being treated are exposed a multiplicity of times to the material being introduced, the desired uniform distribution of the added material being effected by the combination of the repetitive direct addition of relatively small quantities of added fluid and the rubbing contact over a substantial period of time between the particles of the mass moving relative to each other in their free-flowing state.

In order better to understand the more detailed nature of the invention and the manner in which its principles may be employed to effect its several objects, reference may best be had to the ensuing portion of this specification taken in conjunction with the accompanying drawings which illustrate in purely diagrammatic form apparatus suitable for carrying the invention into effect.

In the drawings, Fig. 1 is a view illustrating conditioning apparatus capable of carrying the invention into effect, Fig. 2 is a section taken on line 2—2 of Fig. 1, Fig. 3 is a section on enlarged scale or part of the apparatus shown in Fig. 1, and Fig. 4 is a section taken on line 4—4 of Fig. 3 showing the contour of a cam forming a part of the apparatus.

Referring now to the drawings, I have shown diagrammatically in Fig. 1 apparatus capable of carrying into effect the principles of the invention in numerous different specific aspects thereof and it will be understood that certain portions of the apparatus illustrated may be used to the exclusion of others in case of a plant set up for special purpose operations designed to be limited to a particular treatment of a specific material.

In the apparatus illustrated, a rotary mechanical blender 10 of the tumbling type is provided, the blender advantageously but not necessarily being of the kind comprising two frusto-conical parts 12 joined by a cylindrical central section 14, with the larger or base diameters of the conical parts in confronting relation. The blender is mounted on suitable trunnions 16 and 18 to rotate about the axis 20 which is preferably horizontal. In the embodiment illustrated the small end of one of the conical portions is closed by means of a cover 22, shown hinged to permit charging and removal of a batch of material from the vessel. The vessel is further provided with means pervious to a gaseous fluid but impervious to the solid contents of the vessel, for permitting the escape from the vessel of gaseous fluid which may be introduced into the vessel during the processing of the material. In the embodiment illustrated, this is effected by utilizing a cover 24 of porous metal, such as that made by powder metallurgical methods, or other filtering means such as gauze, fine mesh screen or the like.

The trunnion 16 is hollow to provide means for locating within the vessel a device for introducing fluid to be added to the particle mass while the vessel is being rotated and the mass of material is being tumbled. In the form of apparatus illustrated, this device is in the form of injection means comprising a rotationally stationary injection tube 26 terminating at its inner end in a nozzle or jet orifice 28 located in the central region of the vessel. Conditioning material to be applied in fluid form to the mass of particle material within the vessel is injected from a reservoir or receptacle 30. Air or gas under pressure is supplied through pipe 32 under control of the valve 33 to this receptacle for forcing liquid from the receptacle through a discharge pipe 34 controlled by valve 36 and leading to a tube 38 having an orifice 40 at its inner end. Air or gas is supplied to the outer tube 26 through conduit 42 and, as will be evident from the drawing, when pressure is supplied to the receptacle and valve 36 is opened the pressure will force a stream of liquid through the opening 40 where it will be mixed with the gaseous fluid under pressure in tube 26 and discharged in jet form through the orifice 28. Depending upon factors hereinafter discussed, the form of the fluid as discharged may be as a solid stream or drops of liquid, a coarse or a fine spray, or a vapor, to all of which forms the term "jet" may be generically applied.

While in the accompanying diagrammatic illustration, injection of fluid has been indicated as being accomplished by means of apparatus having only a single injection orifice and utilizing a gaseous medium as an atomizing agent, practice of the invention is not limited to such apparatus since in some instances it may be desirable to employ a plurality of such orifices and it may also be sufficient when spray injection is desired to employ other known forms of injection apparatus of the kind in which a spray is produced by high liquid pressure alone which is released through a suitable jet orifice, as in the case of injection nozzles for Diesel engines.

As previously noted, the invention contemplates the maintenance of the mass of particle material in free-flowing condition while it is being treated. To this end, the fluid introduced into the blending vessel must be controlled as to rate and manner of introduction so as to avoid appreciable wetting of the wall of the vessel since if that occurs agglomeration or lumping of the particle material ensues. To avoid such wetting, the fluid material is introduced into the vessel so that direct contact is substantially entirely between the introduced fluid and the mass of particle material in the vessel.

To this end, when a tumbling vessel of the kind herein illustrated is employed and additional fluid material is injected, the jet is advantageously directed angularly, as indicated at 29 in Fig. 2, so as to be directed toward the upwardly moving or rising side of the vessel, the direction of rotation of the vessel in Fig. 2 being in the direction indicated by the arrow a. In a vessel of the kind iillustrated, the material is carried upwardly along the rising side of the vessel as it rotates and injection in such case in the direction indicated will cause the injected fluid to be directed substantially only toward a part of the vessel where the wall is covered by a mass of the particle material and moreover toward a part of the vessel where the surface of the mass is in actively agitated condition occasioned by the combined rolling and falling action of the particles. Also, it is advantageous in most instances and essential in some for the introduction of the fluid to be made intermittently in a predetermined timed cycle relation to the rotation of the vessel, in order to avoid appreciable wetting of the wall of the vessel. In the embodiment illustrated, this is accomplished by opening valve 36 in timed cycle relation by means of a cam 42, the contour of which is so shaped that the valve is opened at those times in the cycle when the resultant spray will be directed substantially only against the mass of material in the vessel.

The cam illustrated provides two injection periods per revolution of the vessel but it will be understood that in the case of large vessels or forms of blending vessels other than that illustrated, different numbers and timings of injection periods may be employed. Usually, a plurality of injections per revolution of the blending vessel will be employed but in certain instances where relatively small percentages of fluid are to be added this may not be the case, for reasons hereinafter pointed out. An important criterion is avoidance of wetting the wall of the vessel to an extent resulting in substantial agglomeration of the particle material.

In cases where injection is effected by the aid of a gaseous medium, the air or gas for this purpose, and for other purposes hereinafter to be described, is supplied from a suitable pump (not shown) or pressure line 46 to a drier containing a mass 50 of suitable material for absorbing moisture, such for example as activated alumina, for removing at least the greater portion or all of the moisture from the medium supplied to the blending vessel. A conduit 52 in which there is advantageously provided a control valve 54 leads to a heater 56 which may be supplied with heat from any suitable source, such source being diagrammatically illustrated by the burner 58. A conduit 60 connects the outlet of the heater 56 to the tube 62 entering the blender through the hollow trunnion 16, this conduit advantageously being provided with a control valve 64. The conduit 32 leading to the receptacle 30 supplying the injection apparatus is connected under the control of valve 66 to the outlet side of the drier 48 and through a by-pass conduit 68 and control valve 70 is also connected to the outlet of the heater 56. Conduit 32 is connected through the branch conduit 42 advantageously under the control of valve 43 to the tube 26 of the injection apparatus and is further connected by a branch, controlled by valve 61, to the conduit 60. Conduits 32 and 60 are further advantageously supplied with control valves 63 and 65 respectively.

For certain processing adapted to be carried out by means of the invention, the receptacle 30 is advantageously heated as by means of the burner indicated at 31 and also may have provided therein some means for agitating the fluid contents as by means of the mechanical agitator indicated diagrammatically at 35. Further, the connection for carrying the fluid from receptacle 30 to the orifice through which it is injected into the blending vessel may be heated as indicated diagrammatically by the heating coil 37 around the pipes 34, 38.

Other processing contemplated may require limitation of the temperature attained by the mass of particle material and for this purpose the conduit 60 may advantageously be provided with cooling means indicated by the cooling jacket 67 through which a suitable cooling fluid or refrigerant may be passed from inlet 69 to outlet 71.

The apparatus just described may within the purview of the invention be operated in a number of specific ways, depending upon the nature of the materials to be compounded and different specific aspects of the invention may best be understood by examples of which a few representative illustrative cases will be given.

Let it first be assumed that it is desired to produce a batch of uncolored molding powder the base of which is cellulose acetate flake requiring the addition of a relatively large amount of plasticizer. Let it further be assumed that a batch of 100 pounds of such flake is to be plasticized by the addition of a suitable plasticizer such as a mixture of dimethyl and diethyl phthalate in the amount of 47 pounds.

With so much plasticizer to be added to the flake, the principal factor to be guarded against is agglomeration of the mass and to this end it is necessary that the fluid be introduced so that it does not impinge directly on bare wall surface of the vessel and also the rate at which the fluid is fed must be governed so that the tumbling action of the material has ample opportunity to distribute the introduced fluid as it is added.

I have found from experience that when the fluid is added so as to avoid any substantial direct impingement against the walls of the vessel and with a vessel of the kind illustrated being operated at a speed of 20-25 R. P. M., a rate of feed of the fluid material of approximately 0.8 of a pound per minute will operate to uniformly plasticize a batch of material such as that described above without harmful agglomeration thereof and with the material remaining in its substantially dry, free-flowing particle condition.

In some instances, it may be desirable to add relatively very small quantities of fluid conditioning material and in such cases, the primary criterion of the rate of feed is the securing of uniform and thorough distribution throughout the mass of particle material of a relatively very small quantity of added fluid material. An example of this is in the production of so-called monofilament from a vinyl resin where it may be desirable to add as little as two pounds of stabilizer and lubricant in fluid form, such for example as tin soap and modified castor oil, to a one hundred pound batch of particle material. In such a case, I have found that with a blending vessel of the type illustrated, rotated at 20-25 R. P. M., entirely satisfactory uniformity of distribution is obtainable with a rate of feed of approximately 0.2 pound a minute. Where the rate of feed is so low and an intermittent feed is employed, the number of feeding or injection periods per revolution of the vessel may be one or even less in contrast with the plurality of injections usually employed when a relatively large amount of fluid conditioning material is to be added.

Insofar as the control of the rate of feed of added fluid is concerned, this may be accomplished in numerous different ways in addition to the number of injections per revolution when intermittent injection is employed, as for example by the height of the lift of a cam operating an injection control valve and/or control of the pressure at which the liquid and/or gas is admitted to the injection apparatus, so as to control the rate of flow of the fluid during the period of admission whether such period be continuous or intermittent.

The rate of feed is, however, so related to the speed of revolution of the blending vessel that the mass of base material is tumbled a multiplicity of times during the compounding period so that in effect the added fluid is directed against constantly new and different surfaces, thorough distribution being effected by a combination of this factor and the distribution effected by the rubbing contact between the particles within the tumbled mass.

In the event it is desired to employ a colorant, this may optionally be done in different ways depending upon the nature of the colorant. When the desired colorant is naturally in solid form, it may be introduced into the vessel along with the particle material to be colored and blended therewith by tumbling action prior to or concomitantly with the addition of the fluid conditioning material. Alternatively, such a colorant may be reduced to fluid form by a suitable solvent which is not a solvent for the particle material and introduced in liquid form in the same manner as other fluid conditioning materials, the solvent later being removed as hereinafter described. If the colorant is naturally in liquid form, it obviously may be added in the same manner as other fluid conditioning materials. One or another of the procedures outlined above may also be employed in cases where it is desirable to add other conditioning materials, inclusive of fillers, plasticizers, inhibitors, lubricants or the like, which may be naturally in solid form.

The apparatus contemplated by the invention is applicable to the conditioning of a wide variety of basic products to produce a large number of different specific end products. It is particularly well adapted for the plasticizing of materials requiring such treatment, such as the cellulosic derivatives, vinyl polymers and the like, which may be plasticized, colored and/or otherwise conditioned by the addition of suitable known materials which need not here be enumerated for an understanding of the invention. Such other conditioning may involve the addition of a filler in solid particle form and other conditioners such as appropriate stabilizers, inhibitors, lubricants and the like.

The invention is also applicable in the treatment of bitumens which it may be desired to compound or condition with filler and binder for producing an end product capable of being molded by subsequent application of heat and pressure. Also, the invention is applicable in cases where it may be desired to remove residual solvents that may be contained in base material which it is desired to condition in accordance with the invention. The invention is further useful in cases where it may be desired to apply a thin film or coating of a conditioning material such as wax to the particles of the base material.

As is well-known, it is essential that plastic molding powders must be substantially entirely free from moisture if high quality products are to be obtained therefrom by the usual molding operations and the present invention is further highly useful in certain of its aspects to the treatment of material requiring thorough drying before it is suitable for molding operations. To this end, the invention contemplates the provision of suitable apparatus whereby dried and/or heated air or other gaseous medium capable of absorbing and removing from the mass of material moisture or other volatiles may be supplied to and exhausted from the blending vessel and further contemplates the provision of apparatus which will enable such drying to be accomplished selectively in relation to other phases of the conditioning treatment being carried out so that for example the several phases of a given treatment may be carried out in a desired sequence or concomitantly.

The apparatus diagrammatically shown in the drawing is capable of selective use to provide many different specific treatments and while for the sake of simplicity manually operated valves have been shown, it will readily be seen that automatically timed control valves of known construction may be employed for manipulation so that the selected control of specific sequences of events can be accomplished automatically.

By way of example, let it be assumed that it is desired to plasticize and dry a material such as cellulose acetate, using a plasticizer naturally in liquid form. In such case, the liquid is placed in vessel 30 and the compounding effected by air dried in vessel 48 and admitted to the injection apparatus through conduit 32, valves 54, 61 and 70 being closed, heat not being required in order to effect the injection of the liquid plasticizer. After the compounding period is completed, the material may be then thoroughly dried by heated air admitted through the pipe 62, valve 66 being closed and valves 54 and 64 being opened to permit flow of the air from the heater 56 to the blending vessel.

In cases, for example, where the conditioning material to be added in fluid form requires heating to convert it into such form from its naturally solid state, the conditioning material may be placed in the vessel 30 and heated by burner 31 or other source of heat, and also mechanically agitated, particularly in cases where the conditioning material as injected is composed of different substances blended together before being delivered to the blending vessel. In order to avoid re-solidification of such material, the injection apparatus may also be advantageously kept heated as by means of the heating coil 37. Also in such cases, it will usually be desirable to employ heated air if gaseous injection is employed and in such case, the valves 54 and 70 may be opened so as to supply heated air to the injection apparatus. During such a compounding process, it may further be desirable to supply additional heated air to the mass of particle material so as to prevent premature re-solidification of the conditioning material when it strikes the material to be conditioned. Some materials which it may be desired to treat may soften at relatively low temperatures and in some instances it may be desirable to treat such materials with a conditioning material that can be converted to fluid form only by heating to a temperature approaching or even exceeding the temperature at which the material to be treated would soften. Even in such cases, the present invention can be employed to effect the desired treatment by limiting the temperature of the mass of particle material by cooling it as the hot liquid is applied. In the apparatus illustrated, such a procedure may be accomplished by heating the fluid in the container 30, utilizing heated air if desired as a carrier for the injection apparatus by opening valves 54 and 70, while simultaneously introducing cold air into the blending vessel by opening valves 66, 61 and 64, valves 63 and 65 being closed. If required, the cooling air may be refrigerated as by the cooling jacket 67, through which a suitable coolant or refrigerant is circulated from inlet 69 to outlet 71.

From the foregoing examples, it will be apparent that the invention is, in its various aspects, of widely varied utility and it further will be apparent that, depending upon the specific material to be treated and end products desired, certain features hereinbefore described may be employed to the exclusion of others. As will likewise be apparent, fluid conditioning material may be added within the scope of the invention to a mass of particle material comprising only a single constituent such as raw acetate or vinyl powder or to a composite mass in particle form comprising a blended mixture of different constituents. Such particle material, whether consisting of one or more constituent materials, will be referred to herein generally as base material.

As heretofore mentioned, the invention is capable of producing material which in the form as discharged from the blending vessel is suitable for immediate molding without further intermediate steps and to this end the blender may advantageously be located so that the finished material as discharged from the blender may be fed directly to a suitable molding machine. This arrangement is diagrammatically indicated by an extrusion molding machine shown generally at 72. The specific form of the molding machine is not germane to the present invention and for purposes of illustration there is shown an ordinary type of extrusion molding machine having a hopper 74 with a slide cover 76 and delivering to a pressure chamber 78 in which is located a variable pitch screw driven from any suitable source of power indicated by the gearing 80. The pressure chamber is advantageously heated by any suitable means such as the electric heating element indicated at 82 and the material is delivered from the pressure chamber 78 to the extrusion die 84 which forms the molded product 86 to the desired configuration.

In addition to being productive of the numerous advantages previously enumerated, the present invention is productive of a superior quality of product. Due to the fact that the conditioning of the material is carried out at a low temperature level and without the application of appreciable pressure, no degradation of the material is caused by these factors. In contrast with the material produced by the presently commonly employed methods, the particle material or powder produced by the present invention is in what may be said to be non-homogeneous form in which the constituents of the material, which may for example consist of a base material, plasticizer and color, have not undergone any chemical change as a result of the conditioning process, and while thoroughly and uniformly distributed, are not converted into a homogeneous mass until the application for the first time of substantial heat and pressure in the actual molding operation.

As will be apparent from the foregoing description, the invention in its several aspects has a wide field of utility applicable to many different specific materials and combinations thereof to produce many different kinds of desired end products. The invention is accordingly to be understood as not limited to the specific examples herein given by way of illustration but is to be construed as limited only by the scope of the appended claims.

What is claimed:

1. Apparatus of the character described comprising a rotatably mounted blending vessel for confining and tumbling a quantity of substantially dry material in particle form as a mass, means for rotating said vessel, injection means for introducing fluid in atomized or vapor form into said vessel during rotation thereof, said injection means including structure for directing substantially all of the introduced fluid toward the surface of the mass of material being tumbled and away from the walls of the vessel not covered by the material, and valve means operated by said rotating means for controlling the injection of said fluid in accordance with the rotation of said vessel.

2. An apparatus as defined in claim 1 in which a cam on said rotating means operates said valve to provide a plurality of injections during each revolution of said vessel.

3. Apparatus of the character described comprising a rotatably mounted blending vessel for confining and tumbling a quantity of substantially dry material in particle form as a mass, means for rotating said vessel, injection means for introducing fluid in atomized or vapor form into said vessel during rotation thereof, said injection means including structure for directing substantially all of the introduced fluid toward the surface of the mass of material being tumbled and away from the walls of the vessel not covered by the material, and automatic means for intermittently actuating said injection means.

4. Apparatus of the character described comprising a rotatably mounted blending vessel for confining and tumbling a quantity of substantially dry material in particle form as a mass, means for rotating said vessel, injection means for introducing fluid into said vessel during rotation thereof, said injection means including structure for directing substantially all of the introduced fluid toward the surface of the mass of material being tumbled and away from the walls of the vessel not covered by the material, and means for controlling the temperature of the material being tumbled.

5. Apparatus of the character described comprising a rotatably mounted blending vessel for confining and tumbling a quantity of substantially dry material in particle form as a mass, means for rotating said vessel, injection means for introducing fluid into said vessel during rotation thereof, means for heating said fluid prior to the injection thereof, said injection means including structure for directing substantially all of the introduced fluid toward the surface of the mass of material being tumbled and away from the walls of the vessel not covered by the material.

6. Apparatus of the character described comprising a rotatably mounted blending vessel for confining and tumbling a quantity of substantially dry material in particle form as a mass, means for rotating said vessel, injection means for introducing fluid into said vessel during rotation thereof, means for heating said fluid prior to the injection thereof, said injection means including structure for directing substantially all of the introduced fluid toward the surface of the mass of material and away from the walls of the vessel not covered by material, and means for introducing gas into said vessel for controlling the temperature of the material being tumbled.

7. Apparatus of the character described comprising a rotatably mounted closed blending vessel for tumbling a mass of substantially dry material in particle form within said vessel, means for rotating said vessel, injection means including an orifice within said vessel, a source of fluid connected to said injection means, a source of gas under pressure connected to said injection means for forcing said fluid in atomized or vapor form into said vessel during rotation thereof whereby said fluid is applied to the surface of said mass and an outlet for said vessel comprising porous means pervious to gas but impervious to the particles of said material whereby gas may be discharged therethrough while retaining said material in said vessel thus limiting the pressure therein.

8. Apparatus of the character described comprising a rotatably mounted closed blending vessel for tumbling a mass of substantially dry material in particle form within said vessel, means for rotating said vessel, injection means including an orifice within said vessel, a source of fluid connected to said injection means, a source of gas under pressure connected to said injection means for forcing said fluid in atomized or vapor form into said vessel during rotation thereof whereby said fluid is applied to the surface of said mass and a body of porous metal pervious to gas but impervious to the particles of said material constituting a part of the wall structure of said vessel whereby gas may be discharged therethrough while retaining said material in said vessel thus limiting the pressure therein.

9. Apparatus of the character described comprising a closed blending vessel composed of conically shaped parts with the base portions in confronting relation, said vessel being rotatably mounted to turn about a substantially horizontal axis normal to the axis of the conical parts, injection means including an orifice within said vessel, a source of fluid connected to said injection means, a source of gas under pressure connected to said injection means for forcing said fluid in atomized or vapor form into said vessel during rotation thereof and a body of porous metal pervious to gas but impervious to the particles of said material constituting a part of the wall structure of said vessel in the region of the apex end of one of said conical parts whereby gas may be discharged therethrough while retaining said material in said vessel thus limiting the pressure therein.

10. Apparatus of the character described comprising a blending vessel composed of conically shaped parts with the base portions in confronting relation, said vessel being rotatably mounted to turn about a substantially horizontal axis normal to the axis of the conical parts, non-rotatable injection means projecting into said vessel at the axis of rotation and having an outlet orifice, means for supplying liquid to said injection means, automatic means for intermittently interrupting the flow of liquid to said injection means, a source of gaseous fluid under pressure connected to said injection means for forcing said liquid in atomized or vapor form into said vessel, said orifice being disposed to direct said atomized liquid downwardly in the central part of said vessel.

11. Apparatus of the character described comprising a blending vessel composed of conically shaped parts with the base portions in confronting relation, said vessel being rotatably mounted to turn about a substantially horizontal axis normal to the axis of the conical parts, non-rotatable injection means projecting into said vessel at the axis of rotation and having an outlet orifice, means for supplying liquid to said injection means, automatic means operating in timed relation to the rotation of said vessel and intermittently interrupting the flow of liquid to said injection means whereby liquid flows thereto only when the apex end of a conical shaped part of the vessel is in the region of the lower portion of its path of rotation and a source of gaseous fluid under pressure connected to said injection means for forcing said liquid in atomized or vapor form into said vessel said orifice being disposed to direct said atomized liquid downwardly in the central portion of said vessel.

JACK SANDLER.

REFERENCES CITED

The following references are of record in the file of this patent:

UNITED STATES PATENTS

| Number | Name | Date |
|---|---|---|
| 814,166 | Schroeder | Mar. 6, 1906 |
| 1,127,660 | McMichael | Feb. 9, 1915 |
| 1,290,459 | Wilson | Jan. 7, 1919 |
| 1,327,721 | Mattison | Jan. 13, 1920 |
| 1,566,430 | Russell | Dec. 22, 1925 |
| 1,825,475 | Pfeiffer | Sept. 29, 1931 |
| 1,920,463 | Edwards | Aug. 1, 1933 |
| 2,018,082 | Muench et al. | Oct. 22, 1935 |
| 2,173,405 | Whiteley | Sept. 19, 1939 |